United States Patent
Gan et al.

(10) Patent No.: US 6,783,888 B2
(45) Date of Patent: Aug. 31, 2004

(54) CONTROL OF CELL SWELLING BY THE PROPER CHOICE OF CARBON MONOFLUORIDE ($CF_x$) CATHODE MATERIALS IN HIGH RATE DEFIBRILLATOR CELLS

(75) Inventors: Hong Gan, East Amherst, NY (US); Sally Ann Smesko, North Tonawanda, NY (US); Esther S. Takeuchi, East Amherst, NY (US); Steven M. Davis, Batavia, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 315 days.

(21) Appl. No.: 09/859,558

(22) Filed: May 17, 2001

(65) Prior Publication Data

US 2002/0012844 A1 Jan. 31, 2002

Related U.S. Application Data

(60) Provisional application No. 60/205,361, filed on May 18, 2000.

(51) Int. Cl.[7] .................................................. H01M 4/00
(52) U.S. Cl. .................... 429/128; 429/231.7; 429/219; 429/220; 429/221; 429/224; 429/231.1; 429/233; 429/245; 429/231.95; 429/330; 429/333; 429/335; 429/231.5; 29/623.1
(58) Field of Search .......................... 429/231.7, 231.5, 429/219, 220, 221, 224, 231.1, 233, 245, 231.95, 330, 333, 335, 128; 29/623.1

(56) References Cited

U.S. PATENT DOCUMENTS

| | | |
|---|---|---|
| 4,271,242 A | 6/1981 | Toyoguchi et al. ......... 429/194 |
| 4,578,327 A | 3/1986 | Saito et al. .................. 429/194 |
| 4,681,823 A | 7/1987 | Tung et al. .................. 429/218 |
| 4,684,591 A | 8/1987 | Okamura et al. ........... 429/218 |
| 4,737,423 A | 4/1988 | Tung .......................... 429/194 |
| 4,855,121 A | 8/1989 | Metzger ..................... 423/439 |
| 4,908,198 A | 3/1990 | Weinberg ................... 423/415 |
| 5,017,444 A | 5/1991 | Nakajima et al. ........... 429/218 |
| 5,116,592 A | 5/1992 | Weinberg ................... 423/415 |
| 5,175,066 A | 12/1992 | Hamwi et al. .............. 429/192 |
| 5,180,642 A * | 1/1993 | Weiss et al. .................. 429/90 |
| 5,639,577 A | 6/1997 | Takeuchi et al. |
| 5,667,916 A * | 9/1997 | Ebel et al. .................. 429/219 |
| 5,712,062 A | 1/1998 | Yamana et al. ............. 429/218 |
| 5,744,258 A | 4/1998 | Bai et al. |
| 5,811,206 A * | 9/1998 | Sunderland et al. ........ 429/181 |
| 5,902,696 A | 5/1999 | Smesko et al. |
| 6,551,747 B1 * | 4/2003 | Gan ........................... 429/245 |

FOREIGN PATENT DOCUMENTS

| | | |
|---|---|---|
| EP | 58191221 | 8/1983 |
| EP | 58223264 | 12/1983 |
| EP | 0 913 875 A2 | 5/1999 |

OTHER PUBLICATIONS 01112257.9, Abstract, Undated.

* cited by examiner

Primary Examiner—Laura Weiner
(74) Attorney, Agent, or Firm—Michael F. Scalise (57) ABSTRACT

The minimization or elimination of swelling in lithium cells containing $CF_x$ as part of the cathode electrode and discharged under high rate applications is described. When $CF_x$ materials are synthesized from fibrous carbonaceous materials, in comparison to petroleum coke, cell swelling is greatly reduced, and in some cases eliminated. Preferred precursors are carbon fibers and MCMB.

31 Claims, 3 Drawing Sheets

CONTROL OF CELL SWELLING BY THE PROPER CHOICE OF CARBON MONOFLUORIDE ($CF_x$) CATHODE MATERIALS IN HIGH RATE DEFIBRILLATOR CELLS

CROSS-REFERENCE TO RELATED APPLICATION

The present application claims priority based on provisional application Ser. No. 60/205,361, filed May 18, 2000.

BACKGROUND OF THE INVENTION

1. Field of Invention

The present invention generally relates to the conversion of chemical energy to electrical energy. More particularly, the present invention is directed to the use of carbon monofluoride ($CF_x$) in high pulse power cells containing a transition metal oxide such as silver vanadium oxide (SVO).

It has been discovered that when $CF_x$ material is prepared from highly structured carbon precursors, cell swelling during high current pulse discharge conditions is markedly reduced, and in some cases eliminated. Still more particularly, the present invention describes a lithium electrochemical cell designed for high rate discharge applications in which the cathode electrode preferably has a sandwich design of the configuration: SVO/current collector/$CF_x$/current collector/SVO. Cells with this cathode electrode design are particularly applicable for powering implantable medical devices, such as cardiac defibrillators, requiring a relatively low electrical current for device monitoring functions interrupted from time to time by a high current pulse discharge for device activation.

2. Prior Art

U.S. Pat. No. 6,551,747 to Gan, which is assigned to the assignee of the present invention and incorporated herein by reference, describes a sandwiched cathode design for use in a high rate electrochemical cell. The sandwich cathode is composed of a first cathode active material of a relatively high energy density but of a relatively low rate capability, such as $CF_x$, $Ag_2O_2$, and even SVO, sandwiched between two layers of current collector. This assembly is, in turn, sandwiched between two layers of a second cathode active material of a relatively high rate capability but of a relatively low energy density, such as SVO, copper silver vanadium oxide (CSVO) and $MnO_2$. Significantly higher capacities are obtained from lithium cells having sandwich cathode designs of SVO/$CF_x$/SVO relative to those of lithium cells using only SVO active material in a conventional cathode design. A conventional cathode design has the SVO active material contacted to both sides of an intermediate cathode current collection. In addition, the higher capacity of the present invention cell is achieved without sacrificing the cell's power capability. Therefore, lithium cells constructed with a sandwich cathode electrode design are very good candidates as power sources for cardiac defibrillators and other implantable medical devices requiring a high power cell.

Other than cell capacity, an important consideration for an implantable medical device application is cell swelling during discharge. In order to prevent damage to device circuitry, enough void space must be left inside the powered device to accommodate this volume change. The more cell swelling, the more void space that must be reserved. Cell swelling, therefore, impacts the device total volume. In the field of implantable biomedical devices, a smaller total device volume is desired. Thus, in order to provide a more compact device design, it is desirable to minimize or eliminate cell swelling. Excessive cell swelling is also detrimental to the proper functioning of the implantable medical device and, consequently, to its safe use.

Carbon monofluoride, $CF_x$ is a cathode active material that has found wide spread use for low-weight lithium cells. In fact, Li/$CF_x$ cells are particularly useful for discharge applications requiring relatively low currents of about 1 microamperes to about 100 milliamperes. At these discharge rates, cell swelling is generally not observed. However, when Li/$CF_x$ cells having the cathode active material synthesized from petroleum coke are discharged under relatively high current applications, i.e., from about 15.0 $mA/cm^2$ to about 35.0 $mA/cm^2$, significant cell swelling is observed.

Cells powering implantable cardiac defibrillators are periodically pulse discharged under very high current densities of 15.0 $mA/cm^2$ and higher. Therefore, when $CF_x$ is included in a sandwich cathode design as part of an electrode assembly powering an implantable medical device, such as a cardiac defibrillator, and the active material is synthesized from certain carbonaceous precursors such as petroleum coke, a potential cell swelling problem exists.

Accordingly, what is needed is a fluorinated carbon active material which is capable of being subjected to relatively high rate discharge conditions without appreciably swelling. Such a material would be very desirable for inclusion into a high rate cell powering an implantable medical device.

SUMMARY OF THE INVENTION

According to the present invention, the swelling of cells containing sandwich cathodes, such as of a SVO/$CF_x$/SVO configuration, is significantly minimized by using a $CF_x$ material synthesized from carbon fibers, and mesophase carbon microbeads (MCMB). These carbonaceous materials are identified as those which result in the least amount of swelling in cells containing $CF_x$ as part of the cathode material relative to those synthesized from graphite or petroleum coke. This is especially important when the cell is being pulse discharged.

These and other aspects of the present invention will become increasingly more apparent to those skilled in the art by reference to the following description and the appended drawing.

DETAILED DESCRIPTION OF THE PREFERRED EMBODIMENTS

The present invention relates to minimization and even elimination of swelling in lithium cells containing $CF_x$ as part of the cathode electrode and discharged under high rate applications. This improvement in cell functionality results from $CF_x$ materials being synthesized from carbonaceous precursors having special structural characteristics. Preferred precursors are carbon fibers and MCMB. During discharge, and especially during high rate discharge, these $CF_x$ materials retain the layered structure of the carbonaceous precursor.

Upon being discharged in lithium cells, lithium ions intercalate into the layered carbonaceous structure to react with fluorine, which is attached to the carbon backbone either covalently or ionically. This forms lithium fluoride and the reaction is shown below:

It is well known that lithium ions exist in the electrolyte mostly as solvent solvated ions. When lithium ions intercalate into the carbon layers of $CF_x$ during discharge, solvent co-intercalation is also thought to occur. It is hypothesized that the co-intercalated solvent molecules form a solvated reaction intermediate. This intermediate causes destruction of the carbon structure and results in expansion of the discharged $CF_x$ active material. During high rate discharge conditions, a greater amount of solvent molecules co-intercalate into the layered carbonaceous structure within a shorter period of time. Such rapid co-intercalation creates a relatively high concentration of solvent molecules locally which, in turn, causes destruction or expansion of the layered structure at the local region. Therefore, in order to minimize or eliminate cell swelling, destruction or expansion of the layered carbonaceous structure due to solvent co-intercalation needs to be minimized.

Figure 1:
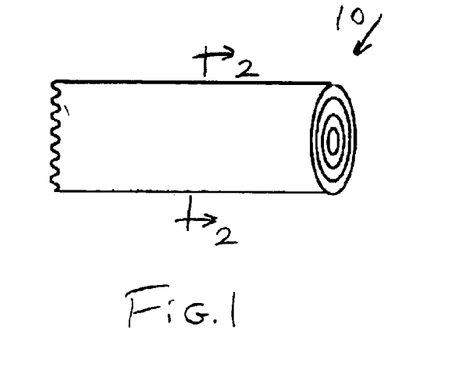
FIG. 1 is a schematic view of carbon fibers having an annual ring layered structure according to the present invention.
Figure 2:
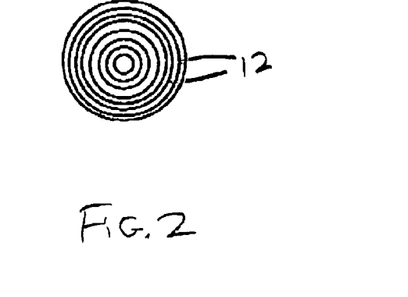
FIG. 2 is a cross-sectional view along line 2—2 of FIG. 1.
Figure 3:
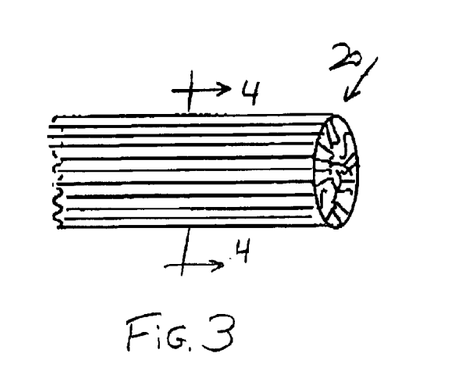
FIG. 3 is a schematic view of carbon fibers having a radial layered structure according to the present invention.
Figure 4:
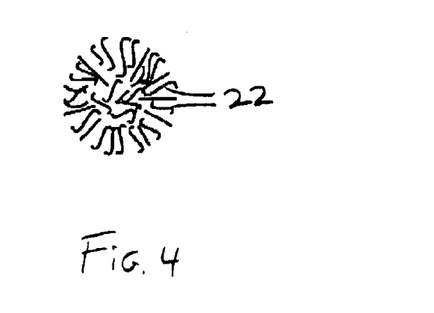
FIG. 4 is a cross-sectional view along line 4—4 of FIG. 3.
Figure 5:
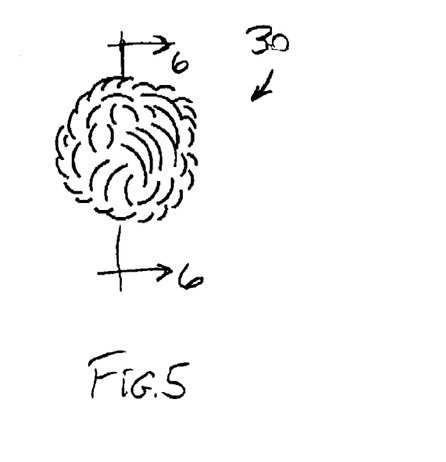
FIG. 5 is a schematic view of mesophase carbon microbeads with a radial-like structure according to the present invention.
Figure 6:
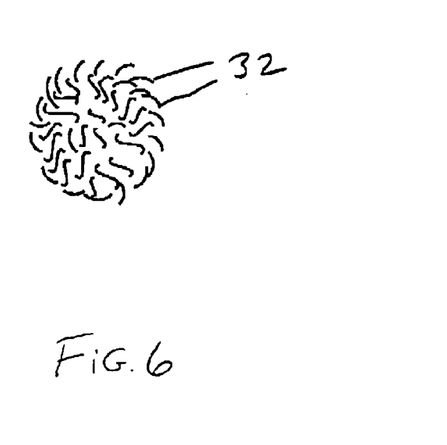
FIG. 6 is a cross-sectional view along line 6—6 of FIG. 5.

Minimization of carbonaceous structure destruction due to co-intercalation is achieved by carefully selecting the microstructure of the carbonaceous precursor materials. In that respect, various carbon fiber materials are suitable for synthesizing $CF_x$ active materials. For example, FIGS. 1 and 2 show a schematic of carbon fibers 10 having annual ring layers 12 where graphite crystallite edges are exposed only on the cross section. FIGS. 3 and 4 show a schematic of carbon fibers 20 with radial layers 22 where the entire fiber surface has the graphite crystallite edges 24 exposed. FIGS. 5 and 6 show a schematic of a MCMB 30 with a radial-like texture where the entire surface of the microbead has exposed graphite crystallite edges 32.

Figure 7:
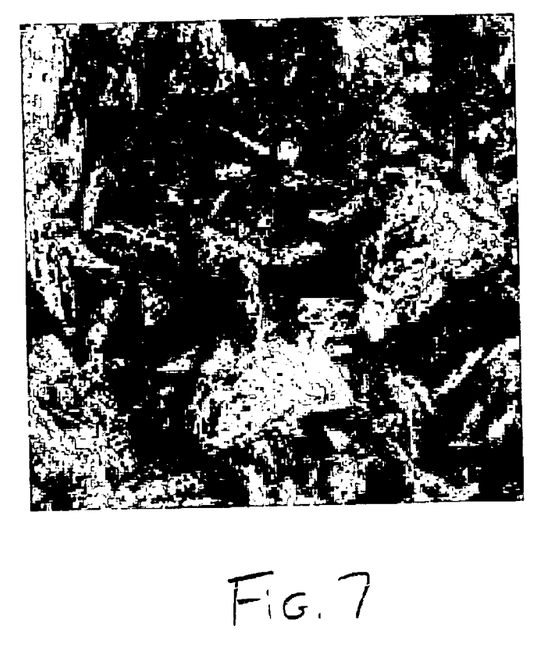
FIG. 7 is a scanning electron microscope photograph of standard $CF_x$ synthesized from petroleum coke having a plate like morphology.
Figure 8:
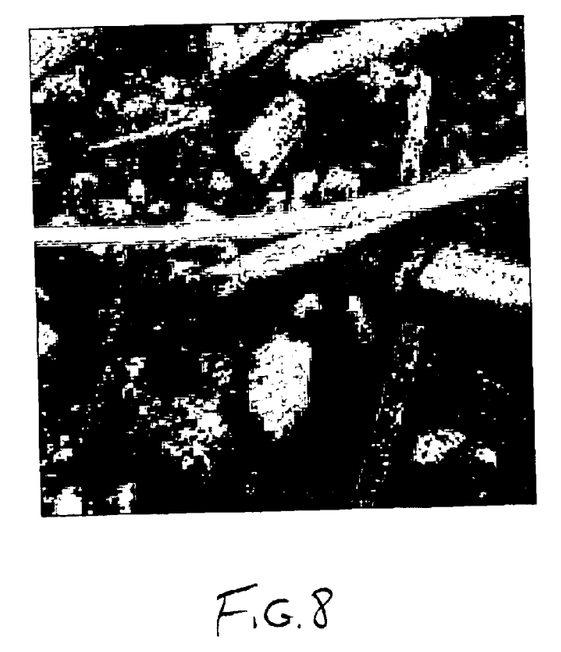
FIG. 8 is a scanning electron microscope photograph of $CF_x$ synthesized from a fibrous carbon material according to the present invention.

$CF_x$ material synthesized from carbon fibers exhibit a markedly different morphology than standard $CF_x$ material synthesized from petroleum coke. When imaged using a scanning electron microscope at 1000x, the standard material displays a plate like morphology (FIG. 7), whereas the present invention material displays a fiber like morphology (FIG. 8). The difference between the materials is also reflected in the five point BET surface area. The surface area of $CF_x$ synthesized from petroleum coke is about 155 m²/g, whereas the surface area of $CF_x$ synthesized from fibrous materials according to the present invention ranges from about 295 m²/g to about 346 m²/g. The prior art $CF_x$ material has a mean particle size, by volume %, of about 16.47 μm, whereas the particle size for the fiber material ranges, by volume %, from about 4.37 μm to about 6.92 μm. A thermogravimetric/differential thermal analysis (TGA/DTA) was simultaneously conducted on both materials under a flowing argon atmosphere at a rate of 20° C. from room temperature to 750° C., and the results are set forth below in Table 1.

TABLE 1

| Parameter | standard $CF_x$ | fiber $CF_x$ |
|---|---|---|
| BET surface area (m²/g) | 155 | 295–346 |
| particle size volume % (μm) | 16.5 | 4.37–6.92 |
| particle size surface area % | 3.97 | 1.71–2.12 |
| particle size number % | 0.716 | 0.642–0.686 |
| DTA exotherm (° C.) | 667 | 652–656 |
| min TGA % weight loss to 750° C. | 79.5 | 75.7 |
| max TGA % weight loss to 750° C. | 83.7 | 83.7 |

The benefit of diminished solvent co-intercalation swelling by using these carbonaceous precursor materials for $CF_x$ synthesis is based on their structure. Since the layered structure of carbon is expected to be maintained after fluorination, the effect of carbon structure on solvent co-intercalation and, consequently, on the swelling of the carbonaceous particles upon discharge is significant. For carbon fibers with an annual ring structure, swelling most likely occurs in the dimension perpendicular to the ring central axis due to the $d_{002}$ spacing increase between the graphite ring layers. However, increase of the $d_{002}$ spacing between the graphite layers is limited because the strength of the carbon-carbon bonds within the graphite layer prevents further expansion of the graphite rings.

In the case of carbon fibers and MCMB with radial like structures, solvent co-intercalation expansion of the carbonaceous materials is expected to be small due to the physical restraint of the carbon layered structure. When solvent molecules intercalate into the carbon layers of these materials, the increased $d_{002}$ spacing between the graphite layers generates expansion tension parallel to the carbon surface. Thus, unless the three dimensional structure of the MCMB carbon fibers breaks apart, the carbon particles are unlikely to swell. As a result, the cell swelling phenomenon is minimized.

In general, any carbonaceous material with a structure which restricts an increase in the $d_{002}$ spacing between graphite layers is considered a good precursor for $CF_x$ synthesis according to the present invention. Accordingly, the use of $CF_x$ synthesized from these carbon materials is beneficial to minimize or eliminate cell swelling.

As used herein, the term "pulse" means a short burst of electrical current of a significantly greater amplitude than that of a pre-pulse current immediately prior to the pulse. A pulse train consists of at least two pulses of electrical current delivered in relatively short succession with or without open circuit rest between the pulses. A typical current pulse is of about 15.0 mA/cm² to about 35.0 mA/cm².

An electrochemical cell that possesses sufficient energy density and discharge capacity required to meet the vigorous requirements of implantable medical devices comprises an anode of a metal selected from Groups IA, IIA and IIIB of the Periodic Table of the Elements. Such anode active materials include lithium, sodium, potassium, etc., and their alloys and intermetallic compounds including, for example, Li—Si, Li—Al, Li—B and Li—Si—B alloys and intermetallic compounds. The preferred anode comprises lithium. An alternate anode comprises a lithium alloy such as a lithium-aluminum alloy. The greater the amount of aluminum present by weight in the alloy, however, the lower the energy density of the cell.

The form of the anode may vary, but preferably the anode is a thin metal sheet or foil of the anode metal, pressed or rolled on a metallic anode current collector, i.e., preferably comprising titanium, titanium alloy or nickel, to form an anode component. Copper, tungsten and tantalum are also suitable materials for the anode current collector. In an exemplary cell according to the present invention, the anode component has an extended tab or lead of the same material as the anode current collector, i.e., preferably nickel or titanium, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical cell of the present invention further comprises a cathode of at least a first electrically conductive material that serves as the other electrode of the cell. The cathode is preferably of solid materials and in one embodiment has a sandwich design as described in the previously referenced U.S. Pat. No. 6,551,747 to Gan. The sandwich cathode design comprises a first active material of a fluorinated carbon compound prepared from the carbonaceous materials described above. Fluorinated carbon is represented by the formula $(CF_x)_n$ wherein x varies between about 0.1 to 1.9 and preferably between about 0.5 and 1.2, and $(C_2F)_n$ wherein the n refers to the number of monomer units which can vary widely.

The sandwich cathode design further includes a second active material of a relatively low energy density and a relatively high rate capability in comparison to the first fluorinated carbon cathode active material. One preferred second active material is a transition metal oxide having the general formula $SM_xV_2O_y$ where SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide having the general formula $Ag_xV_2O_y$ in any one of its many phases, i.e., β-phase silver vanadium oxide having in the general formula x=0.35 and y=5.8, γ-phase silver vanadium oxide having in the general formula x=0.80 and y=5.40 and ε-phase silver vanadium oxide having in the general formula x=1.0 and y=5.5, and combination and mixtures of phases thereof. For a more detailed description of such cathode active materials reference is made to U.S. Pat. No. 4,310,609 to Liang et al., which is assigned to the assignee of the present invention and incorporated herein by reference.

Another preferred composite transition metal oxide cathode material includes $V_2O_z$ wherein z≦5 is combined with $Ag_2O$ with silver in either the silver(II), silver(I) or silver(0) oxidation state and CuO with copper in either the copper(II), copper(I) or copper(0) oxidation state to provide the mixed metal oxide having the general formula $Cu_xAg_yV_2O_z$, (CSVO). Thus, the composite cathode active material may be described as a metal oxide-metal oxide-metal oxide, a metal-metal oxide-metal oxide, or a metal-metal-metal oxide and the range of material composition found for $Cu_xAg_yV_2O_z$ is preferably about 0.01≦z≦6.5. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material reference is made to U.S. Pat. No. 5,472,810 to Takeuchi et al. and U.S. Pat. No. 5,516,340 to Takeuchi et al., both of which are assigned to the assignee of the present invention and incorporated herein by reference.

One exemplary sandwich cathode electrode has the following configuration:

SVO/current collector/$CF_x$/current collector/SVO

Another exemplary sandwich cathode electrode configuration is:

SVO/current collector/SVO/$CF_x$/SVO/current collector/SVO

Still another configuration for an electrochemical cell with a sandwich electrode has a lithium anode and a cathode configuration of:

SVO/current collector/$CF_x$, with the SVO facing the lithium anode.

In a broader sense, it is contemplated by the scope of the present invention that the second active material of the sandwich cathode design is any material which has a relatively lower energy density but a relatively higher rate capability than the first active material. In that respect, other than silver vanadium oxide and copper silver vanadium oxide, $V_2O_5$, $MnO_2$, $LiCoO_2$, $LiNiO_2$, $LiMn_2O_4$, $TiS_2$, CuS, FeS, $FeS_2$, CuO, copper vanadium oxide (CVO), and mixtures thereof are useful as the second active material.

Before fabrication into a sandwich electrode for incorporation into an electrochemical cell according to the present invention, the first and second cathode active materials prepared as described above are preferably mixed with a binder material such as a powdered fluoro-polymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoropolymer binder present at about 3 weight percent, a conductive diluent present at about 3 weight percent and about 94 weight percent of the cathode active material.

A second embodiment of a present invention cell is constructed according to U.S. Pat. No. 5,639,577 to Takeuchi et al. This patent describes a cathode active blend of fluorinated carbon and a transition metal oxide. By blending is meant that the already prepared active materials of $CF_x$ and CSVO are comingled together in a relatively homogeneous mixture. Again, the fluorinated carbon is prepared from the carbonaceous precursors described above. According to this patent, the preferred transition metal oxide is CSVO. However, other active materials including SVO as described above with respect to the second cathode active material of the sandwich electrode design are also useful when blended with $CF_x$. This cell is described as being particularly useful for high current pulse discharge applications, for example at about 15.0 mA/cm² and above.

Cathode components for incorporation into an electrochemical cell according to the present invention may be prepared by rolling, spreading or pressing the first and second cathode active materials onto a suitable current collector selected from the group consisting of stainless steel, titanium, tantalum, platinum, gold, aluminum, cobalt nickel alloys, nickel-containing alloys, highly alloyed ferritic stainless steel containing molybdenum and chromium, and nickel-, chromium- and molybdenum-containing alloys. The preferred current collector material is titanium, and most preferably the titanium cathode current collector has a thin layer of graphite/carbon material, iridium, iridium oxide or platinum applied thereto. Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the Group IA, IIA or IIIB anode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C.H. Dexter, Div., Dexter Corp.).

The electrochemical cells of the present invention further include a nonaqueous, ionically conductive electrolyte which serves as a medium for migration of ions between the anode and the cathode electrodes during the electrochemical reactions of the cells. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The inorganic, ionically conductive salt serves as the vehicle for migration of the anode ions to intercalate or react with the cathode active material. Preferably, the ion forming alkali metal salt is similar to the alkali metal comprising the anode.

In the case of an anode comprising lithium, the alkali metal salt of the electrolyte is a lithium based salt. Known lithium salts that are useful as a vehicle for transport of alkali metal ions from the anode to the cathode include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof.

A preferred chemistry for a sandwich cathode electrode according to the present invention has a lithium metal anode and a cathode electrode comprising (SVO) and fluorinated carbon ($CF_x$). In the sandwich structure, $CF_x$ material is sandwiched between two cathode current collectors. This assembly is, in turn, sandwiched between two layers of SVO material. The electrolyte activating the cells is 0.8M to 1.5M $LiAsF_6$ or $LiPF_6$ in a 1:1, by volume, mixture of propylene carbonate and 1,2-dimethoxyethane. Preferably, the electrolyte also contains 0.05M dibenzyl carbonate (DBC), as described in U.S. Pat. Nos. 5,753,389 and 6,221,534, both to Gan et al. and both assigned to the assignee of the present invention and incorporated herein by reference.

The following examples describe the manner and process of an electrochemical cell according to the present invention, and they set forth the best mode contemplated by the inventors of carrying out the invention, but they are not to be construed as limiting.

EXAMPLE I

Six test cells were constructed having lithium anode material pressed on a nickel current collector screen. The cathodes used two layers of titanium current collector screen and had the sandwich configuration of: SVO/current collector/$CF_x$/current collector/SVO. A prismatic cell stack assembly comprising two layers of microporous membrane polypropylene separator disposed between the anode and cathode was prepared. The electrode assembly was then hermetically sealed in a stainless steel casing in a case negative configuration and activated with an electrolyte of 1.0M $LiAsF_6$ in a 50:50 mixture, by volume of PC and DME with 0.05M DBC dissolved therein. The theoretical capacity of the cells was 2.645 Ah.

Two of the test cells were constructed having $CF_x$ synthesized from petroleum coke (group 1) while four of the cells were constructed with $CF_x$ synthesized from carbon fiber (group 2). A representative cell from each of groups 1 and 2 was accelerated pulse discharged. This discharge regime consisted of pulse trains of four 10 second 2 Amp current pulses with a 15 second rest between each pulse. The pulse trains were applied every 30 minutes. The capacities delivered to three voltages cut-offs are summarized in Table 2.

TABLE 2

| Group | Capacity at Cut Off (mAh) | | | Efficiency at Cut Off (%) | | |
|---|---|---|---|---|---|---|
| | 2. V | 1.7 V | 1.5 V | 2.0 V | 1.7 V | 1.5 V |
| 1 | 1816 | 2069 | 2274 | 68.7 | 78.2 | 86.0 |
| 2 | 1967 | 2205 | 2320 | 74.4 | 83.4 | 87.7 |

The data in Table 2 demonstrate that the representative group 2 cell having a sandwich cathode design with $CF_x$ synthesized from carbon fiber delivered more discharge capacity at a higher efficiency than the representative group 1 cell having $CF_x$ in a sandwich cathode design synthesized from petroleum coke to all three voltages cut offs.

EXAMPLE II

Figure 9:
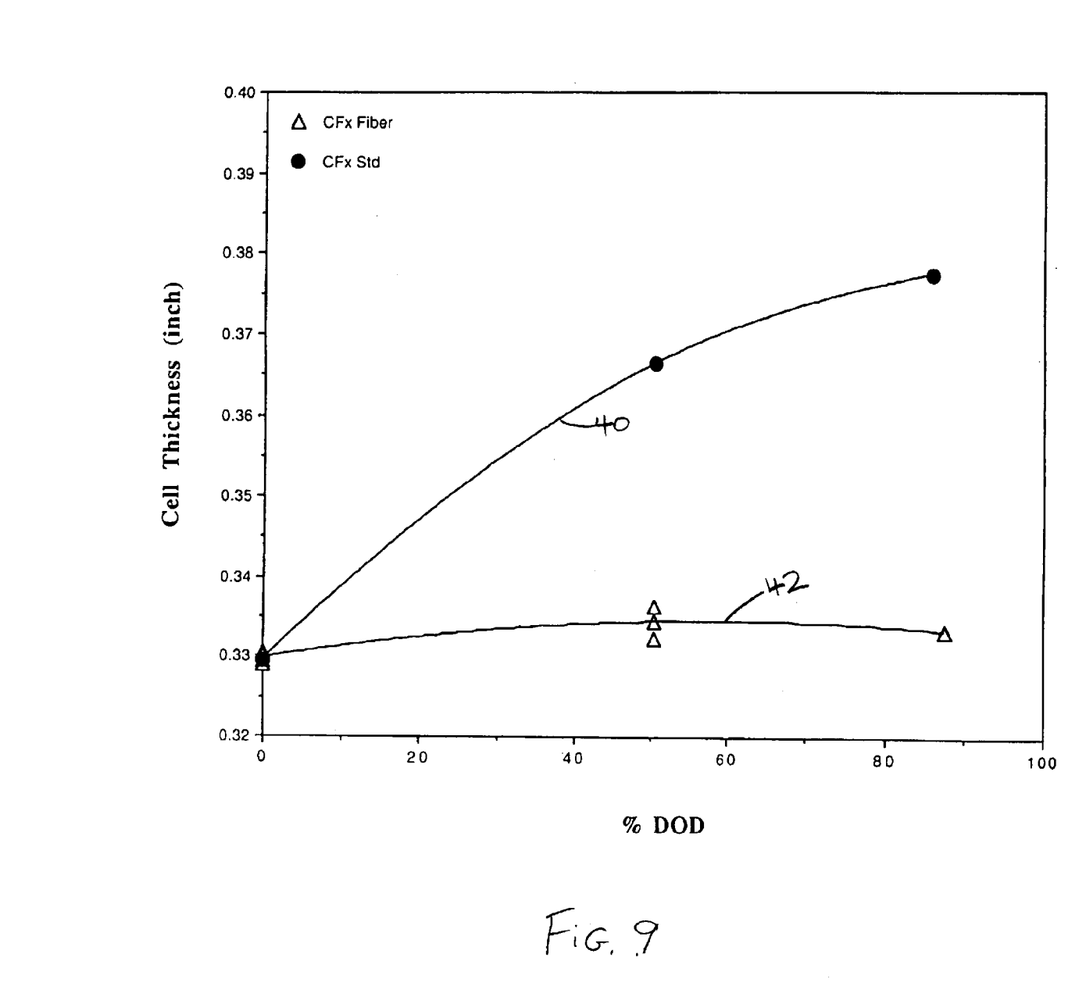
FIG. 9 is a graph of cell thickness versus depth of discharge for a prior art cell having $CF_x$ synthesized from petroleum coke in comparison to a present invention cell having $CF_x$ synthesized from carbon fiber.

To demonstrate the swelling characteristics of the groups 1 and 2 cells, one cell from group 1 and three cells from group 2 were discharged in a similar manner as the cells in Example I except only 50% of the theoretical capacity was removed. Cell thickness was measured before and after this discharge test. Cell thickness was also measured before and after discharge of the cell of Example I. The thickness data from these tests is summarized in FIG. 9 where the group 1 cell, curve 40, swelled significantly. In fact, the larger the DOD, the greater the cell swelling. In contrast, the group 2 cells, curve 42, exhibited fairly insignificant swelling throughout discharge.

It is appreciated that various modifications to the inventive concepts described herein may be apparent to those skilled in the art without departing from the spirit and scope of the present invention as defined by the hereinafter appended claims.

What is claimed is:

1. An electrochemical cell, which comprises:
   a) an anode;
   b) a cathode of a first fluorinated carbon of a first energy density and a first rate capability and a second cathode active material of a second energy density and a second rate capability, wherein the first energy density of the first fluorinated carbon is greater than the second energy density while the first rate capability is less than the second rate capability of the second cathode active material;
   c) a cathode current collector comprising spaced apart major sides with the first fluorinated carbon positioned proximate one of the major sides and the second cathode active material proximate the other major side; and
   d) an electrolyte comprising at least one solvent for activating the anode and the cathode, wherein the fluorinated carbon is characterized as having been synthesized from a fibrous carbonaceous material having sufficient spacing between graphite layers to substantially restrict expansion due to solvent co-intercalation.

2. The electrochemical cell of claim 1 wherein the cell is dischargeable at a current pulse of at least about 15.0 $mA/cm^2$.

3. The electrochemical cell of claim 1 wherein the fluorinated carbon synthesized from the fibrous carbonaceous material has a BET surface area of greater than about 250 $m^2/g$.

4. The electrochemical cell of claim 1 wherein the fluorinated carbon synthesized from the fibrous carbonaceous material has a particle size volume percent of less than about 15 $\mu m$.

5. The electrochemical cell of claim 1 wherein the fluorinated carbon synthesized from the fibrous carbonaceous material has a particle size surface area percent of less than about 3.5.

6. The electrochemical cell of claim 1 wherein the fluorinated carbon synthesized from the fibrous carbonaceous material has a DTA exotherm of about 652° C. to about 656° C.

7. The electrochemical cell of claim 1 wherein the carbonaceous material is selected from the group consisting of carbon fibers with an annual ring layered structure having graphite crystallite edges exposed only on the cross-section, carbon fibers with a radial layered structure having the entire fiber surface with exposed graphite crystallite edges, and mesophase carbon microbeads with a radial-like texture having the entire surface of the microbead with exposed graphite crystallite edges.

8. The electrochemical cell of claim 1 wherein the second cathode active material is selected from the group consisting of silver vanadium oxide, copper silver vanadium oxide, $V_2O_5$, $MnO_2$, $LiCoO_2$, $LiNiO_2$, $LiMnO_2$, CuO, TiS, CuS, FeS, $FeS_2$, copper vanadium oxide, and mixtures thereof.

9. The electrochemical cell of claim 1 wherein the cathode has the configuration: SVO/current collector/$CF_x$/current collector/SVO.

10. The electrochemical cell of claim 1 wherein the cathode has the configuration: SVO/current collector/SVO/$CF_x$/SVO/current collector/SVO.

11. The electrochemical cell of claim 1 wherein the anode is lithium and the cathode has the configuration: SVO/current collector/$CF_x$, with the SVO facing the lithium anode.

12. The electrochemical cell of claim 1 wherein the first cathode active material is sandwiched between a first and second current collectors with the second cathode active material contacting the first and second current collectors opposite the first cathode active material.

13. The electrochemical cell of claim 12 wherein the first and second current collectors are titanium having a coating selected from the group consisting of graphite/carbon material, iridium, iridium oxide and platinum provided thereon.

14. The electrochemical cell of claim 1 wherein the anode is lithium, the first cathode active material is $CF_x$, the second cathode active material is SVO and the cathode current collector is titanium or aluminum.

15. The electrochemical cell of claim 1 wherein the electrolyte has a first solvent selected from an ester, a linear ether, a cyclic ether, a dialkyl carbonate, and mixtures thereof, and a second solvent selected from a cyclic carbonate, a cyclic ester, a cyclic amide, and mixtures thereof.

16. The electrochemical cell of claim 15 wherein the first solvent is selected from the group consisting of tetrahydrofuran, methyl acetate, diglyme, trigylme, tetragylme, dimethyl carbonate, 1,2-dimethoxyethane, 1,2-diethoxyethane, 1-ethoxy, 2-methoxyethane, ethyl methyl carbonate, methyl propyl carbonate, ethyl propyl carbonate, diethyl carbonate, dipropyl carbonate, and mixtures thereof, and the second solvent is selected from the group consisting of propylene carbonate, ethylene carbonate, butylene carbonate, acetonitrile, dimethyl sulfoxide, dimethyl formamide, dimethyl acetamide, γvalerolactone, γbutyrolactone, N methyl-pyrrolidinone, and mixtures thereof.

17. The electrochemical cell of claim 1 including a lithium salt selected from the group consisting of $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

18. The electrochemical cell of claim 1 wherein the electrolyte is 0.8M to 1.5M $LiAsF_6$ or $LiPF_6$ dissolved in a 50:50 mixture, by volume, of propylene carbonate and 1,2-dimethoxyethane.

19. An electrochemical cell, which comprises:
   a) a lithium anode;

b) a cathode of a first cathode active material of $CF_x$ sandwiched between a first and second current collectors with a second cathode active material selected from the group consisting of SVO, CSVO, $V_2O_5$, $MnO_2$, $LiCoO_2$, $LiNiO_2$, $LiMnO_2$, $CuO_2$, TiS, $Cu_2S$, FeS, $FeS_2$, CVO, and mixtures thereof, contacting the first and second current collectors opposite the first cathode active material; and c) an electrolyte comprising at least one solvent for activating the anode and the cathode, wherein the fluorinated carbon is characterized as having been synthesized from a fibrous carbonaceous material having sufficient spacing between graphite layers to substantially restrict expansion due to solvent co-intercalation.

20. The electrochemical cell of claim 19 wherein the current collectors are of titanium.

21. A method for powering an implantable medical device, comprising the steps of:
a) providing the medical device;
b) providing an electrochemical cell comprising the steps of:
  i) providing an anode of an alkali metal;
  ii) providing a cathode of $CF_x$ as a first cathode active material of a first energy density and a first rate capability sandwiched between first and second current collectors with a second cathode active material of a second energy density and a second rate capability, wherein the first energy density of the $CF_x$ is greater than the second energy density while the first rate capability is less than the second rate capability of the second cathode active material; and
  iii) activating the anode and cathode with an electrolyte comprising at least one solvent, wherein the fluorinated carbon is characterized as having been synthesized from a fibrous carbonaceous material having sufficient spacing between graphite layers to substantially restrict expansion due to solvent co-intercalation; and
c) electrically connecting the electrochemical cell to the medical device.

22. The method of claim 21 including discharging the cell to provide a current pulse of at least about 15.0 mA/cm².

23. The method of claim 21 including providing the fluorinated carbon synthesized from the fibrous carbonaceous material having a BET surface area of greater than about 250 m²/g.

24. The method of claim 21 including providing the fluorinated carbon synthesized from the fibrous carbonaceous material having a particle size volume percent of less than about 15 μm.

25. The method of claim 21 including providing the fluorinated carbon synthesized from the fibrous carbonaceous material having a particle size surface area percent of less than about 3.5.

26. The method of claim 21 including providing the fluorinated carbon synthesized from the fibrous carbonaceous material having a mean DTA exotherm of about 652° C. to about 656° C.

27. The method of claim 21 including selecting the second cathode active material from the group consisting of silver vanadium oxide, copper silver vanadium oxide, $V_2O_5$, $MnO_2$, $LiCoO_2$, $LiNiO_2$, $LiMnO_2$, CuO, TiS, CuS, FeS, $FeS_2$, copper vanadium oxide, and mixtures thereof.

28. The method of claim 21 wherein the anode is lithium, the first cathode active material is $CF_x$ and the second cathode active material is SVO.

29. The method of claim 21 including providing the cathode having the configuration: SVO/current collector/$CF_x$/current collector/SVO.

30. The method of claim 21 including providing the cathode having the configuration: SVO/current collector/SVO/$CF_x$/SVO/current collector/SVO.

31. The method of claim 22 including providing the anode of lithium and the cathode having the configuration: SVO/current collector/$CF_x$, with the SVO facing the lithium anode.

* * * * *

UNITED STATES PATENT AND TRADEMARK OFFICE
CERTIFICATE OF CORRECTION

PATENT NO. : 6,783,888 B2
DATED : August 31, 2004
INVENTOR(S) : Hong Gan et al.

It is certified that error appears in the above-identified patent and that said Letters Patent is hereby corrected as shown below:

Column 9,
Line 38, "material proximate the other major side" should read --material contacting the other major side of the cathode current collector --;
Line 56, "size volume percent" should read -- size, by volume % --;
Line 60, "surface area percent" should read -- surface, by area % --;

Column 10,
Line 53, "γvalerolactone" should read -- γ-valerolactone --;
Line 54, "γbutyrolactone, N methyl-pyrrolidinone" should read -- γ-butyrolactone, N-methyl-pyrrolidinone --;

Column 11,
Line 6, after "contacting", please insert -- at least one of --;

Column 11, lines 18-40 and Column 12, lines 1-2,
Claim 21, please delete the entire claim and replace it with:
21. A method for powering an implantable medical device, comprising the steps of:
 a) providing the medical device;
 b) providing an electrochemical cell comprising the steps of:
  i) providing an anode of an alkali metal;
  ii) providing $CF_x$ as a first cathode active material of a first energy density and a first rate capability and providing a second cathode active material of a second energy density and a second rate capability, wherein the first energy density of the $CF_x$ is greater than the second energy density while the first rate capability is less than the second rate capability of the second cathode active material;
  iii) providing a cathode current collector comprising spaced apart major sides;
  iv) positioning the $CF_x$ proximate one of the major sides of the cathode current collector;
  v) contacting the second cathode active material to the other major side of the cathode current collector; and
  vi) activating the anode and cathode with an electrolyte comprising at least one solvent, wherein the fluorinated carbon is characterized as having been synthesized from a fibrous carbonaceous material having sufficient spacing between graphite layers to substantially restrict expansion due to solvent co-intercalation; and
 c) electrically connecting the electrochemical cell to the medical device.

UNITED STATES PATENT AND TRADEMARK OFFICE
CERTIFICATE OF CORRECTION

PATENT NO. : 6,783,888 B2
DATED : August 31, 2004
INVENTOR(S) : Hong Gan et al.

It is certified that error appears in the above-identified patent and that said Letters Patent is hereby corrected as shown below:

Column 12,
Line 11, "size volume percent" should read -- size, by volume % --; and
Line 14, "surface area percent" should read -- surface, by area % --.

Signed and Sealed this

Twenty-fourth Day of May, 2005

JON W. DUDAS
*Director of the United States Patent and Trademark Office*